(12) United States Patent
Poder

(10) Patent No.: US 9,852,604 B2
(45) Date of Patent: *Dec. 26, 2017

(54) BUILDING SECURITY SYSTEM

(71) Applicant: Comcast Cable Communications, LLC, Philadelphia, PA (US)

(72) Inventor: James Poder, Cheltenham, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,853

(22) Filed: Nov. 16, 2016

(65) Prior Publication Data

US 2017/0200363 A1 Jul. 13, 2017

Related U.S. Application Data

(63) Continuation of application No. 14/936,099, filed on Nov. 9, 2015, now Pat. No. 9,530,303, which is a continuation of application No. 14/511,906, filed on Oct. 10, 2014, now Pat. No. 9,214,080, which is a continuation of application No. 13/604,938, filed on Sep. 6, 2012, now Pat. No. 8,902,311, which is a continuation of application No. 13/243,463, filed on Sep. 23, 2011, now Pat. No. 8,289,147, which is a continuation of application No. 12/324,139, filed on Nov. 26, 2008, now Pat. No. 8,049,613.

(51) Int. Cl.
G08B 23/00 (2006.01)
G08B 25/00 (2006.01)

(52) U.S. Cl.
CPC .................. *G08B 25/001* (2013.01)

(58) Field of Classification Search
CPC .................................................. G08B 25/001
USPC ...................... 340/517, 3.1, 506, 511, 539.1
See application file for complete search history.

(56) References Cited

U.S. PATENT DOCUMENTS

| | | | |
|---|---|---|---|
| 4,103,293 A | 7/1978 | La Forge, Jr. |
| 5,400,246 A | 3/1995 | Wilson et al. |
| 5,959,529 A | 9/1999 | Kail, IV |
| 6,064,064 A | 5/2000 | Castleman |
| 8,049,613 B2 | 11/2011 | Poder |
| 8,289,147 B2 | 10/2012 | Poder |

(Continued)

FOREIGN PATENT DOCUMENTS

| | | |
|---|---|---|
| EP | 1959409 A2 | 8/2008 |
| EP | 2192563 A1 | 6/2010 |

(Continued)

OTHER PUBLICATIONS

European Search Report—EP 12183032—dated Oct. 23, 2012.

(Continued)

*Primary Examiner* — Daryl Pope
(74) *Attorney, Agent, or Firm* — Banner & Witcoff, Ltd.

(57) ABSTRACT

A security system that can be used in a home, office, or other building in order to generate alarms or take other actions depending on conditions within the building. The security system may rely on sensors within the building which sense various conditions and collect other data. The information learned from the sensors can be communicated to a location outside the building for processing, such as, but not limited to, processing associated with a need to instigate an alarm.

83 Claims, 2 Drawing Sheets

(56) References Cited

U.S. PATENT DOCUMENTS

| | | | |
|---|---|---|---|
| 2004/0056765 A1 | 3/2004 | Anderson et al. | |
| 2004/0215750 A1 | 10/2004 | Stilp | |
| 2005/0038326 A1 | 2/2005 | Mathur | |
| 2006/0195716 A1 | 8/2006 | Bittner | |
| 2007/0262857 A1 | 11/2007 | Jackson | |
| 2008/0048861 A1 | 2/2008 | Naidoo et al. | |
| 2016/0125724 A1* | 5/2016 | Poder ................. | G08B 13/2491 348/143 |

FOREIGN PATENT DOCUMENTS

| | | | |
|---|---|---|---|
| WO | 9939505 A1 | 8/1999 | |
| WO | 0201531 A1 | 1/2002 | |
| WO | 2006/091422 A2 | 8/2006 | |
| WO | 2008013359 A1 | 1/2008 | |

OTHER PUBLICATIONS

EP office action issued in EP 12183032.7—dated Jul. 17, 2013.

Response to European Search Report—EP12183032.7—Filed on Jun. 7, 2013.

Response to Office Action EP12183032.7 dated Jul. 17, 2013—as filed on Nov. 15, 2013.

Valera, M. et al., "Intelligent Distributed Surveillance Systems: A Review," IEEE Proceedings F. Communications, Radar & Signal Processing, Institution of Electrical Engineers, vol. 152, No. 2, Apr. 8, 2005, pp. 192-204.

International Search Report dated Mar. 2, 2010 in European Application No. 09175981.

European Office Action dated Feb. 21, 2011 in Application No. 09175981.1.

Canadian Intellectual Property Office Action dated Mar. 27, 2012 in Canadian Application No. 2,685,652.

European Summons to Attend Oral Proceedings dated Mar. 29, 2012 in European Application No. 09175981.1.

European Summons to Attend Oral Proceedings dated Feb. 4, 2015, in European Application No. 12183032.7.

* cited by examiner

BUILDING SECURITY SYSTEM

This application is a continuation of pending U.S. patent application Ser. No. 14/936,099, filed on Nov. 9, 2015, which is a continuation of U.S. patent application Ser. No. 14/511,906, filed on Oct. 10, 2014 (now U.S. Pat. No. 9,214,080), which is a continuation of U.S. patent application Ser. No. 13/604,938, filed on Sep. 6, 2012 (now U.S. Pat. No. 8,902,311), which is a continuation of U.S. patent application Ser. No. 13/243,463, filed on Sep. 23, 2011 (now U.S. Pat. No. 8,289,147), which is a continuation of U.S. patent application Ser. No. 12/324,139, filed on Nov. 26, 2008 (now U.S. Pat. No. 8,049,613), which applications are hereby incorporated by reference.

BACKGROUND OF THE INVENTION

1. Field of the Invention

The present invention relates to building security systems.

2. Background Art

FIG. 1 illustrates a building security system 10 where a gateway/security panel 12 within a building 14 processes alarm system information. The panel 12 locally generates an alarm if the alarm system information indicates a suitable security risk. The alarm system information may be derived from a number of sensors 16 positioned throughout the building 14. The security panel 12 may immediately generate the alarm and/or transmit the alarm to a central monitoring station 18 for verification. In either case, the need for the alarm is determined locally at the building 14.

These local determinations can be problematic, at least, from a service and maintenance perspective. Since the gateway/security panel software used to assess the need for the alarm resides locally in the building 14, any updates or modifications relevant to alarm assessments must be made at the building 14. This requires the panel 12 to be locally modified if it is to accommodate new devices and application logic when new devices, monitoring techniques, or other changes to the building security system are desired. This can increase both complexity and cost of devices in the building 14 when new monitoring features are added or current monitoring capabilities are adjusted.

BRIEF DESCRIPTION OF THE DRAWINGS

The present invention is pointed out with particularity in the appended claims. However, exemplary embodiments and certain features of the present invention will be described below in conjunction with the accompany drawings, in which:

DETAILED DESCRIPTION OF THE PREFERRED EMBODIMENT(S)

Figure 1:
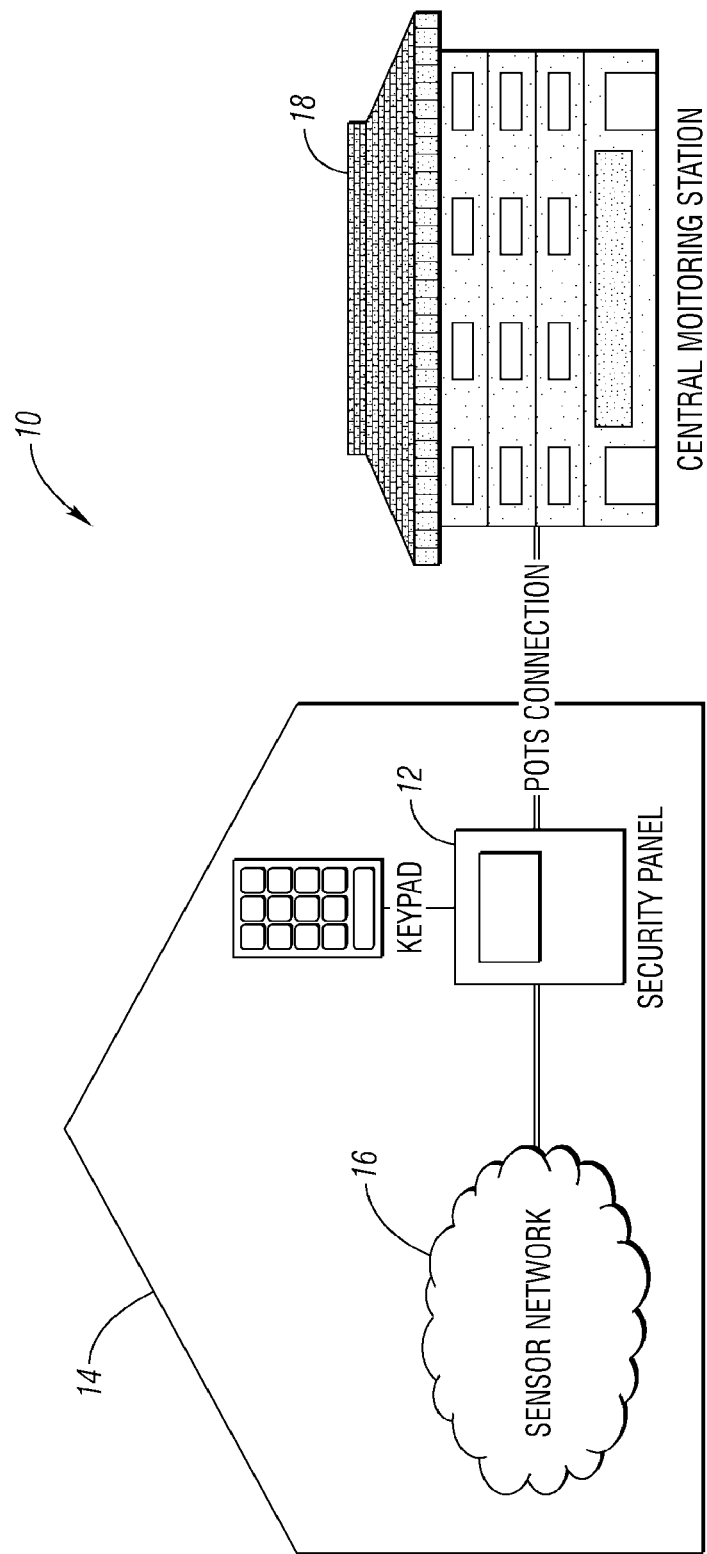
FIG. 1 illustrates a building security system.
Figure 2:
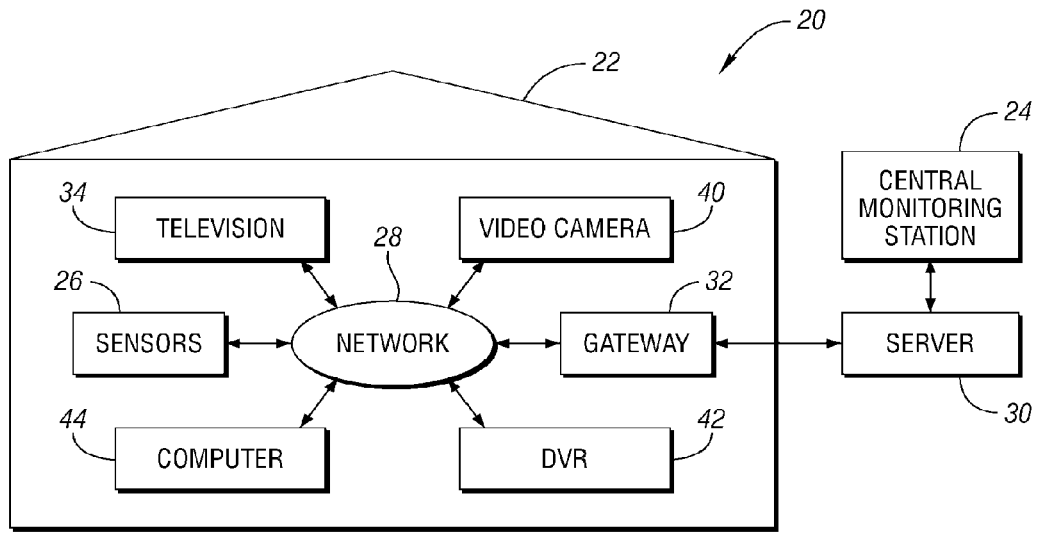
FIG. 2 illustrates a building security system in accordance with one embodiment of the present invention.

FIG. 2 illustrates a building security system 20 in accordance with one embodiment of the present invention. The building security system 20 may be configured to support security-related surveillance and services for a home, office, or other building 22. A security service provider 24, such as a central monitoring station, may communicate with the building 22 to support any number of building security processes. The system 20 may support security processes that rely on one or more sensors 26, such as audio, video, temperature, air quality, and presence sensors, to monitor related conditions within the building 22. Data regarding the monitored conditions can be communicated over a network 28 to a central monitoring server 30. While FIG. 2 illustrates an embodiment of the invention in connection with a building, the invention is not limited to implementation with a building. By way of example only, the invention can be implemented with any number of buildings, a facility or the like. Nor does the type of building(s) or facility(ies) limit the invention. By way of example only, the building(s) and/or facility(ies) could be residential, commercial or the like.

The network 28 may be any type of wireless or wireline network such as, but not limited, to a high speed data network used by cable television service providers to support cable television signaling and/or other types of networks used to support high speed data and non-television related signaling. The network may be used to support continuous transmission of data from the sensors 26 regardless of whether the monitored conditions have changed. This stream of data can be transmitted to the central monitoring server 30 for further processing.

The central monitoring server 30 may assess the need to instigate an alarm from the information provided by the sensors 26. A gateway 32, for example a settop box (STB), cable modem, router, and/or other service provider/supported device within the building may be used to communicate the data collected by the sensors 26 regarding the conditions in the building 22 to the central monitoring server 30. The gateway 32 encapsulates or otherwise packages the data provided by the sensors 26 for transmission to the central monitoring server 30 without performing security-related processing.

The security-related processing associated with triggering the alarms is performed by the central monitoring server 30. This alleviates processing demands on the gateway 32. If changes or other updates to the security process are needed, i.e., to support new functionality, home devices, sensors, etc., the central monitoring server 30 may be updated instead of requiring significant updates to the gateway 32.

The central monitoring server 30 may be configured to monitor conditions in a number of buildings 22 and to separately instigate alarms in each building 22. Each building 22 may similarly transmit sensed conditions to the central monitoring server 30 for processing. Because the central monitoring server 30 is used instead of the gateway 32 to assess the need for the alarm, the central monitoring server 30 is updated to support updated functionality in each of the buildings 22 without requiring significant updates in the buildings. This can limit the cost of updates when the service provider 24 provides additional services to customers.

The central monitoring server 30 may include any number of applications that perform any number of security processes, such as, but not limited to, those associated with elder monitoring, video monitoring, audio monitoring, medical monitoring, energy management, and/or some combination thereof.

For example, elder monitoring may include monitoring for movements within the building 22 and generating an alarm if movements are not determined over a period of time. Video monitoring may use facial recognition or other techniques to assess whether intruders are within the building 22. For example, a video camera 40 may be included to capture video from within the building 22, and a DVR 42 may begin recording video when presence detectors sense a presence within a room while the building security system 20 is armed. This video can be transmitted to the server 30 for intruder analysis and/or alarm verification. Similarly, audio monitoring can operate with the video monitoring to support related security assessments. The information from any sensor 26 can be used with information from the other sensors 26 to assess the need for an alarm.

Figure 3:
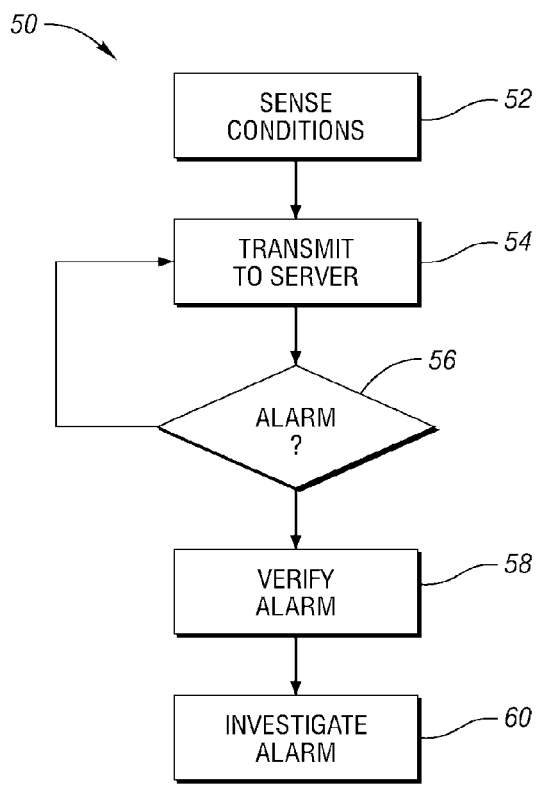
FIG. 3 illustrates a flowchart for a method of supporting building security in accordance with one embodiment of the present invention.

FIG. 3 illustrates a flowchart 50 for a method of supporting building security in accordance with one embodiment of the present invention. The method may be used to instigate any type of alarm and to facilitate any type of security measure. Instead of detailing each of the numerous types of alarms contemplated by the present invention, the described alarm, or generic alarm, is intended to include any type of alarm. The method, without intending to limit the scope and contemplation of the present invention, is predominately described with respect to the processes used to determine a need to instigate the alarm and other features associated therewith.

Block 52 relates to sensing one or more conditions within a building 22. This may include the use of any type of sensor 26 to sense any type of condition within the building 22. Some of the sensors 26 may be presence sensors that sense the presence of a human or animal, door sensors that sense whether a door (room, appliance, cabinet, etc.) is opened or closed, temperature sensors (room, body, etc.), air quality sensors (e.g. carbon monoxide detectors), and the like. The sensors 26 may also include video, audio, and other multiple media sensors. Each of the sensors 26 are connected to a building network 28 having capabilities that allow the conditions sensed by the sensors 26 to be delivered to the gateway 32.

Block 54 relates to the gateway 32 transmitting the sensed data to the central monitoring server 30. This is done without assessing the need to instigate or otherwise generate an alarm. Of course, the present invention contemplates performing some alarm assessment at the building and optionally generating the alarm without reliance or complete reliance on the central monitoring server 30. The data may be transmitted over any one-way or two-way wireless (e.g., GSM, CDMA, Wi-Fi, WiMax) or wireline network 28 (e.g., fiber optic, hybrid fiber coaxial, coaxial only, copper pair).

Block 56 relates to determining a need to generate or otherwise instigate an alarm. The need to instigate the alarm is determined by the central monitoring server 30 based on the information transmitted in Block 54 and without assessment by the gateway 32. The alarm may be any type of alarm and may vary depending on the conditions within the building 22. The alarm may be varied over time and in response to changes in conditions at the building 22, i.e., the urgency of the alarm can be escalated if conditions change within the building 22.

One type of alarm may be a building-based alarm that requires playback of an audio alert (siren, message, etc.), actuation of a device (door lock, fire extinguisher, etc.), or the execution of other operations at the building 22. Another type of alarm may be a non-building-based alarm that requires alerting or otherwise communicating with a governmental services agency, such as police, fire, medical, or other entity outside the building 22. Yet another type of alarm may include some combination of the building and non-building-based alarms.

Block 58 relates to verifying authenticity of the alarm. The authenticity of the alarm may be verified in an effort to combat false alarms and other inappropriate allocations of resources. In some cases, customers can be penalized if governmental service agencies respond to false alarms. The verification process may require the entry of a password or other security measure to insure an authorized person or entity verifies the need or lack of need for the alarm.

One process for verifying alarm authenticity may require in-building verification. The in-building verification may be of the type that requires an occupant within the building 22 to verify the necessity of instigating the alarm. The central monitoring server 30 may open a communication channel with the building 22 or, more particularly, with one or more devices in the building 22. The communication may be sufficient to control various operations of the device in order to request an occupant to respond to a verification response message.

One verification request may include displaying a message on a television within the building 22. The central monitoring server 30 may instruct the STB 34 to display a message on the television 34 that requests the occupant to acquiesce to the alarm, such as by selecting a button on a remote control or on the STB 34. The central monitoring server 30 may also open a communications session (POTS call, IM session, SMS message, etc.) or VoIP call with a device in the building 22 to request confirmatory information. The communications necessary to these operations and other operations may be carried out over any wireline or wireless network 18, including a cable television network.

Another verification process may include verifying the alarm from other information collected from the building 22. If a fire is detected with a fire sensor, for example, the sensors that sense temperature and air quality may be used to verify the fire detected by the fire sensor. If an intruder is detected with a presence sensor, for example, video may be retrieved from the DVR 42 and reviewed by a computer 44 for facial recognition or played for a human operator to assess the presence of an intruder.

These and other processes of verifying the sensed conditions triggering the alarm with other sensed conditions can be helpful if communications with the building 22 are lost or otherwise disrupted. Rather than relying on communications with the building 22, the central monitoring server 30 can analyze the information it has already accumulated to verify the need for the alarm. This process can also be helpful if the only person in the building 22 is an intruder or another individual that is unwilling or unable to verify authenticity.

Block 60 relates to instigating the alarm. The instigated alarm may vary depending on the events triggering the alarm. The scope, duration, intensity, and other parameters of the alarm may be varied over time. The central monitoring server 30 may adjust or discontinue the alarm if additional information is received from the sensors 26 within the building 22 and/or in response to an interrupt. An interrupt may be instigated if a building occupant's response to the verification request after the alarm is instigated and/or if an entity arriving at the building otherwise terminates the alarm.

As supported above, one non-limiting aspect of the present invention contemplates a common, extensible protocol for a gateway 32 in a building 22 to encapsulate or translate sensor 26 data. This data can then be sent to one or many application servers 30 that will decode the data and determine if action needs to be taken based on user-selected monitoring criteria. One scenario may include a building 22 that has signed up for both a building security service and an elder monitoring service. A motion sensor 26 in the living room can be used to detect motion in the building 22. The gateway 32 can wrap a data packet from the activated motion sensor 26 with a tag that identifies the particular building 22 or gateway 32 and send it to the application server 30. The data packet can be received by several, if not all of the application servers 30 and used as necessary. The security server 30 can determine that a motion sensor 26 was activated in the building 22, and optionally, verify that the building 22 has subscribed to its service. The security server 30 can search its database to verify if the alarm is currently armed or disarmed. If the alarm is armed, the security server 30 can send a signal to the central monitoring station 24 indicating an intrusion. If it is disarmed, the security server 30 can log the event and remain inactive. The elder monitoring server 30 can also receive the same data packet from the building 22 and verify that the building is a subscriber. The elder monitoring server 30 can be configured to notify a friend/neighbor/family member in case there is no "activity" (motion) in the building 22 for a period of time. Because motion is detected, the countdown timer can be reset in the elder monitoring server 30. Should the timer reach zero, the alarm notification can be sent.

By building the system 20 in this manner, the gateway 32 can be an extremely inexpensive device or integrated into other devices already in the building 22. The application can be standard regardless of what devices are added to the building 22 or what services are added to the network. Additionally, services may include medical monitoring, audio monitoring, visual monitoring, or combinations thereof. Additional features include using the gateway 32, television 34, or internet to activate or deactivate the security system 20 and using the STB/television 34, or internet to monitor the building 22 from a remote location. Optionally, the STB/television 34, or a displayed supported through an application running on it, may be used to check the status of any one or more of the sensors 26 at anytime, such as to view video of particular areas within the building 22 upon hearing a threatening sound, assess whether a door sensor is detecting a door to be open, assess whether the security system 20 has been armed, etc.

The foregoing is predominately described with respect to activating a security related alarm, such as but not limited to illuminating a light source, displaying a message, calling an emergency response entity, locking doors, activating a siren or taking other security related measures. The present invention, however, is not intended to be so limited. The present invention contemplates non-security related alarms, such as alarms used to indicate faults or failures within appliances within the home, a need to replace a lighting source, a need to answer a door, and/or to take action in response to any number of measureable events occurring within a building or facility. As such, the term 'alarm' as used throughout the foregoing is intended to encompass any type of message, transmission, activation, or other responsive event used to communicate a significant, meaningful, relevant or monitored for change in status as reflected by one or more sensed conditions.

Particular embodiments of the present invention have been disclosed and described above; however, it is to be understood that the disclosed embodiments are merely exemplary of the invention, which may take various alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A system comprising:
    a gateway device:
        a processor; and
        memory storing executable instructions that, when executed by the processor of the gateway device, cause the gateway device to:
            transmit, to a computing device, first sensor data associated with a first sensor at a location; and
    the computing device comprising:
        a processor; and
        memory storing executable instructions that, when executed by the processor of the computing device, cause the computing device to:
            receive, from the gateway device, the first sensor data associated with the first sensor at the location;
            determine that the first sensor data indicates an alarm condition at the location;
            after determining that the first sensor data indicates the alarm condition, receive second sensor data associated with a second sensor at the location;
            determine to activate an alarm based on a determination that the second sensor data associated with the second sensor verifies the alarm condition; and
            in response to determining to activate the alarm, transmit an instruction to activate the alarm.

2. The system of claim 1, wherein the first sensor comprises a fire sensor, and the second sensor is configured to sense one or more of temperature or air quality at the location.

3. The system of claim 1, wherein the first sensor comprises a presence sensor, and the second sensor is configured to capture video at the location.

4. The system of claim 1, wherein the second sensor comprises an image capture device configured to capture images, and wherein the executable instructions, when executed by the processor of the computing device, further cause the computing device to:
    in response to determining that the first sensor data indicates the alarm condition at the location, transmit an instruction for the image capture device to capture one or more images representative of conditions at the location, wherein the second sensor data comprises the one or more images captured by the image capture device.

5. The system of claim 1, wherein the executable instructions, when executed by the processor of the computing device, further cause the computing device to:
    after the alarm is activated, transmit an instruction to vary one or more of a scope, duration, or intensity of the alarm.

6. The system of claim 5, wherein the executable instructions, when executed by the processor of the computing device, further cause the computing device to:
    receive, from the gateway device, additional data associated with the first sensor or the second sensor;
    determine, based on the additional data, to vary one or more of the scope, duration, or intensity of the alarm; and
    transmit the instruction to vary one or more of the scope, duration, or intensity of the alarm in response to determining to vary one or more of the scope, duration, or intensity of the alarm.

7. The system of claim 1, wherein the executable instructions, when executed by the processor of the computing device, further cause the computing device to:
  transmit an instruction to deactivate the alarm based on additional data associated with the first sensor or the second sensor.

8. The system of claim 1, wherein the executable instructions, when executed by the processor of the computing device, further cause the computing device to:
  receive the second sensor data from the gateway device.

9. The system of claim 8, wherein the gateway device comprises a settop box, a cable modem, or a router.

10. An apparatus comprising:
  a processor; and
  memory storing executable instructions that, when executed by the processor, cause the apparatus to:
    receive first sensor data associated with a first sensor at a location;
    determine that the first sensor data indicates an alarm condition at the location;
    after determining that the first sensor data indicates the alarm condition, receive second sensor data associated with a second sensor at the location;
    determine to activate an alarm based on a determination that the second sensor data associated with the second sensor verifies the alarm condition; and
    in response to determining to activate the alarm, transmit an instruction to activate the alarm.

11. The apparatus of claim 10, wherein the first sensor comprises a fire sensor, and the second sensor is configured to sense one or more of temperature or air quality at the location.

12. The apparatus of claim 10, wherein the first sensor comprises a presence sensor, and the second sensor is configured to capture video at the location.

13. The apparatus of claim 10, wherein the second sensor comprises an image capture device configured to capture images, and wherein the executable instructions, when executed by the processor, further cause the apparatus to:
  in response to determining that the first sensor data indicates the alarm condition at the location, transmit an instruction for the image capture device to capture one or more images representative of conditions at the location, wherein the second sensor data comprises the one or more images captured by the image capture device.

14. The apparatus of claim 10, wherein the executable instructions, when executed by the processor, further cause the apparatus to:
  after the alarm is activated, transmit an instruction to vary one or more of a scope, duration, or intensity of the alarm.

15. The apparatus of claim 10, wherein the executable instructions, when executed by the processor, further cause the apparatus to:
  receive additional data associated with the first sensor or the second sensor;
  determine, based on the additional data, to vary one or more of a scope, duration, or intensity of the alarm; and
  in response to determining to vary one or more of the scope, duration, or intensity of the alarm and after the alarm is activated, transmit an instruction to vary one or more of the scope, duration, or intensity of the alarm.

16. The apparatus of claim 10, wherein the executable instructions, when executed by the processor, further cause the apparatus to:
  transmit an instruction to deactivate the alarm based on additional data associated with the first sensor or the second sensor.

17. The apparatus of claim 10, wherein the executable instructions, when executed by the processor, further cause the apparatus to:
  receive the first sensor data from a gateway device and receive the second sensor data from the gateway device.

18. The apparatus of claim 17, wherein the gateway device comprises a settop box, a cable modem, or a router.

19. A system comprising:
  a first computing device comprising:
    a processor; and
    memory storing executable instructions that, when executed by the processor of the first computing device, cause the first computing device to:
      send, to a second computing device, first sensor data associated with a first sensor at a location, wherein the first sensor data indicates an alarm condition at the location;
      after sending the first sensor data, receive an instruction to send data to verify the alarm condition;
      in response to receiving the instruction, send second sensor data associated with a second sensor at the location; and
      receive an instruction to activate an alarm, wherein the instruction to activate the alarm is based on the second sensor data verifying the alarm condition at the location; and
  the second computing device comprising:
    a processor; and
    memory storing executable instructions that when executed by the processor of the second computing device, cause the second computing device to:
      receive, from the first computing device, the first sensor data associated with the first sensor at the location.

20. The system of claim 19, wherein the first sensor comprises a fire sensor, and the second sensor is configured to sense one or more of temperature or air quality at the location.

21. The system of claim 19, wherein the first sensor comprises a presence sensor, and the second sensor is configured to capture video at the location.

22. The system of claim 19, wherein the second sensor comprises an image capture device configured to capture images, wherein the instruction to send data to verify the alarm condition comprises an instruction for the image capture device to capture one or more images representative of conditions at the location, and wherein the second sensor data comprises the one or more images captured by the image capture device.

23. The system of claim 19, wherein the executable instructions, when executed by the processor of the first computing device, further cause the first computing device to:
  after the alarm is activated, receive an instruction to vary one or more of a scope, duration, or intensity of the alarm.

24. The system of claim 19, wherein the executable instructions, when executed by the processor of the first computing device, further cause the first computing device to:
  send additional data associated with the first sensor or the second sensor; and after the alarm is activated and based on the additional data sent by the first computing device, receive an instruction to vary one or more of a scope, duration, or intensity of the alarm.

25. The system of claim 19, wherein the executable instructions, when executed by the processor of the first computing device, further cause the first computing device to:
   send additional data associated with the first sensor or the second sensor; and
   receive an instruction to deactivate the alarm after sending the additional data associated with the first sensor or the second sensor.

26. An apparatus comprising:
   a processor; and
   memory storing executable instructions that, when executed by the processor, cause the apparatus to:
      send first sensor data associated with a first sensor at a location, wherein the first sensor data indicates an alarm condition at the location;
      after sending the first sensor data, receive an instruction to send data to verify the alarm condition;
      in response to receiving the instruction, send second sensor data associated with a second sensor at the location; and
      receive an instruction to activate an alarm, wherein the instruction to activate the alarm is based on the second sensor data verifying the alarm condition at the location.

27. The apparatus of claim 26, wherein the first sensor comprises a fire sensor, and the second sensor is configured to sense one or more of temperature or air quality at the location.

28. The apparatus of claim 26, wherein the first sensor comprises a presence sensor, and the second sensor is configured to capture video at the location.

29. The apparatus of claim 26, wherein the second sensor comprises an image capture device configured to capture images, wherein the instruction to send data to verify the alarm condition comprises an instruction for the image capture device to capture one or more images representative of conditions at the location, and wherein the second sensor data comprises the one or more images captured by the image capture device.

30. The apparatus of claim 26, wherein the executable instructions, when executed by the processor, further cause the apparatus to:
   after the alarm is activated, receive an instruction to vary one or more of a scope, duration, or intensity of the alarm.

31. The apparatus of claim 26, wherein the executable instructions, when executed by the processor, further cause the apparatus to:
   send additional data associated with the first sensor or the second sensor; and
   after the alarm is activated and based on the additional data sent by the apparatus, receive an instruction to vary one or more of a scope, duration, or intensity of the alarm.

32. The apparatus of claim 26, wherein the executable instructions, when executed by the processor, further cause the apparatus to:
   send additional data associated with the first sensor or the second sensor; and
   receive an instruction to deactivate the alarm after sending the additional data associated with the first sensor or the second sensor.

33. A system comprising:
   a first computing device comprising:
      a processor; and
      memory storing executable instructions that, when executed by the processor of the first computing device, cause the first computing device to:
         receive sensor data from a sensor at a location, wherein the sensor data indicates an alarm condition at the location;
         determine a tag that indicates the location;
         send, to a second computing device, the sensor data and the tag that indicates the location;
         in response to sending the sensor data and the tag, receive an instruction to activate an alarm at the location; and
         cause the alarm at the location to be activated; and
   the second computing device comprising:
      a processor; and
      memory storing executable instructions that, when executed by the processor of the second computing device, cause the second computing device to:
         receive, from the first computing device, the sensor data and the tag that indicates the location.

34. The system of claim 33, wherein the sensor data from the sensor comprises first sensor data from a first sensor, and wherein the executable instructions, when executed by the processor of the first computing device, further cause the first computing device to:
   after sending the first sensor data and the tag, receive an instruction to send data to verify the alarm condition at the location;
   in response to receiving the instruction to send data, send second sensor data associated with a second sensor at the location; and
   in response to sending the second sensor data, receive the instruction to activate the alarm at the location.

35. The system of claim 34, wherein sending the second sensor data comprises sending the second sensor data and the tag that indicates the location.

36. The system of claim 33, wherein the executable instructions, when executed by the processor of the first computing device, further cause the first computing device to:
   after the alarm is activated, receive an instruction to vary one or more of a scope, duration, or intensity of the alarm.

37. The system of claim 33, wherein the sensor comprises one or more of a fire sensor, a temperature sensor, an air quality sensor, or a sensor configured to capture images.

38. The system of claim 33, wherein the executable instructions, when executed by the processor of the first computing device, further cause the first computing device to:
   cause the alarm at the location to be deactivated based on additional sensor data from the sensor.

39. An apparatus comprising:
   a processor; and
   memory storing executable instructions that, when executed by the processor, cause the apparatus to:
      receive sensor data from a sensor at a location, wherein the sensor data indicates an alarm condition at the location;
      determine a tag that indicates the location;
      send, to a computing device, the sensor data and the tag that indicates the location;

in response to sending the sensor data and the tag, receive an instruction to activate an alarm at the location; and cause the alarm at the location to be activated.

40. The apparatus of claim 39, wherein the sensor data from the sensor comprises first sensor data from a first sensor, and wherein the executable instructions, when executed by the processor, further cause the apparatus to:

after sending the first sensor data and the tag, receive an instruction to send data to verify the alarm condition at the location;

in response to receiving the instruction to send data, send second sensor data associated with a second sensor at the location; and in response to sending the second sensor data, receive the instruction to activate the alarm at the location.

41. The apparatus of claim 40, wherein the executable instructions, when executed by the processor, further cause the apparatus to:

send the second sensor data and the tag that indicates the location.

42. The apparatus of claim 39, wherein the executable instructions, when executed by the processor, further cause the apparatus to:

after the alarm is activated, receive an instruction to vary one or more of a scope, duration, or intensity of the alarm.

43. The apparatus of claim 39, wherein the sensor comprises one or more of a fire sensor, a temperature sensor, an air quality sensor, or a sensor configured to capture images.

44. The apparatus of claim 39, wherein the executable instructions, when executed by the processor, further cause the apparatus to:

cause the alarm at the location to be deactivated based on additional sensor data from the sensor.

45. An apparatus comprising:
a processor; and
memory storing executable instructions that, when executed by the processor, cause the apparatus to:
receive data indicative of sensed conditions at a first location remote from a second location, wherein the apparatus is at the second location;
determine whether to activate an alarm at the first location based on the received data; and
in response to determining to activate the alarm at the first location, transmit, to a computing device at the first location, a message indicative of a request to verify the determination to activate the alarm.

46. The apparatus of claim 45, wherein the executable instructions, when executed by the processor, further cause the apparatus to:

determine whether to activate the alarm based on monitoring criteria associated with one of elder monitoring, video monitoring, audio monitoring, medical monitoring, energy management, and a combination thereof.

47. The apparatus of claim 45, wherein the executable instructions, when executed by the processor, further cause the apparatus to:

transmit the message indicative of a request for a video display device at the first location to display a verification response message prompting a user to verify the determination to activate the alarm.

48. The apparatus of claim 45, wherein the executable instructions, when executed by the processor, further cause the apparatus to:

transmit the message indicative of a request for a communications device at the first location to prompt a user to verify the determination to activate the alarm.

49. The apparatus of claim 45, wherein the executable instructions, when executed by the processor, further cause the apparatus to:

transmit the message indicative of a request for the computing device to verify the determination to activate the alarm based on additional data indicative of additional sensed conditions at the first location.

50. The apparatus of claim 45, wherein the executable instructions, when executed by the processor, further cause the apparatus to:

verify the determination to activate the alarm at the first location based on the received data.

51. The apparatus of claim 45, wherein the alarm at the first location is activated, and wherein the executable instructions, when executed by the processor, further cause the apparatus to:

receive additional data indicative of additional sensed conditions at the first location;

determine whether to discontinue the activated alarm at the first location based on the received additional data; and in response to determining to discontinue the activated alarm at the first location, transmit, to the computing device, a message indicative of a request to discontinue the activated alarm.

52. The apparatus of claim 45, wherein the alarm at the first location is activated, and wherein the executable instructions, when executed by the processor, further cause the apparatus to:

receive additional data indicative of additional sensed conditions at the first location;

determine whether to vary a parameter of the activated alarm at the first location based on the received additional data, wherein the parameter comprises one of a scope, a duration, an intensity, and a combination thereof; and in response to determining to vary the activated alarm at the first location, transmit, to the computing device, a message indicative of a request to vary the activated alarm based on the determination.

53. An apparatus comprising:
a processor; and
memory storing executable instructions that, when executed by the processor, cause the apparatus to:
receive, from a computing device at a first location remote from a second location, sensor data indicative of a sensed condition at the first location and identification data identifying the computing device, wherein the apparatus is at the second location;
determine that the computing device is subscribed to a monitoring service based on the identification data;
determine whether an alarm at the first location is armed at a time corresponding to the sensed condition;
if the alarm at the first location is armed at the time corresponding to the sensed condition, transmit, to a second computing device at a third location remote from the second location and the first location, the sensor data indicative of the sensed condition, the identification data, and event data indicating that an event has occurred at the first location; and
if the alarm at the first location is disarmed at the time corresponding to the sensed condition, store the sensor data indicative of the sensed condition, the identification data, and event data indicating that an event has occurred at the first location.

54. The apparatus of claim 53, wherein the monitoring service is one of an elder monitoring service, a video monitoring service, an audio monitoring service, a medical monitoring service, an energy management service, and a combination thereof.

55. The apparatus of claim 53, wherein the executable instructions, when executed by the processor, further cause the apparatus to, if the alarm at the first location is armed at the time corresponding to the sensed condition:
receive, from the second computing device, a message indicative of a request to verify a determination made by the second computing device to activate the alarm at the first location; and
transmit, to the computing device, the message indicative of the request to verify the determination made by the second computing device to activate the alarm at the first location.

56. An apparatus comprising:
a processor; and
memory storing executable instructions that, when executed by the processor, cause the apparatus to:
receive first data indicative of an alarm condition sensed by a first sensor;
receive second data indicative of an alarm condition sensed by a second sensor at a same location as the first sensor, wherein the second sensor is different from the first sensor, and wherein the alarm conditions sensed by the first sensor and the second sensor correspond to a common alarm event;
determine that the first data indicates a need to activate an alarm;
prior to activating the alarm, verify a need to activate the alarm based on the second data; and
in response to verifying the need to activate the alarm, transmit an instruction to activate the alarm.

57. The apparatus of claim 56, wherein the first sensor and the second sensor comprise two of the following: an audio sensor, a video camera, a temperature sensor, an air quality sensor, and a presence sensor.

58. The apparatus of claim 56, wherein the second data comprises one or more of video recorded on a digital video recorder, a live video feed, and data received from a settop box used to process television signals for output to a television.

59. The apparatus of claim 56, wherein the executable instructions, when executed by the processor, further cause the apparatus to:
receive the first data from a settop box used to process television signals for output to a television; and
receive the second data from the settop box.

60. The apparatus of claim 56, wherein, after receiving the first data and receiving the second data, the apparatus is not in communication with any device at the location of the first sensor and the second sensor.

61. The apparatus of claim 56, wherein the executable instructions, when executed by the processor, further cause the apparatus to:
determine that the first data indicates the need to activate the alarm based on monitoring criteria associated with one of one or more of elder monitoring, video monitoring, audio monitoring, medical monitoring, and energy management.

62. The apparatus of claim 56, wherein the executable instructions, when executed by the processor, further cause the apparatus to:

receive third data from the first sensor;
receive fourth data from the second sensor; and
determine that the third data indicates a need to activate an alarm, but in response to determining that the fourth data does not indicate a need to activate any alarm, maintaining an alarm in an inactivated state in response to the third data and the fourth data.

63. The apparatus of claim 62, wherein the executable instructions, when executed by the processor, further cause the apparatus to:
determine that the first data has surpassed a threshold associated with normal operation and that the second data has not surpassed the threshold.

64. The apparatus of claim 56, wherein the executable instructions, when executed by the processor, further cause the apparatus to:
receive the second data after determining that the first data indicates the need to activate the alarm.

65. The apparatus of claim 64, wherein the second sensor comprises a video camera, and wherein the executable instructions, when executed by the processor, further cause the apparatus to:
transmit an instruction to activate the video camera to record, to a digital video recorder, video representative of conditions proximate the location;
receive a portion of the recorded video; and
transmit the instruction to activate the alarm if the portion of the video confirms the need to activate the alarm.

66. The apparatus of claim 56, wherein the executable instructions, when executed by the processor, further cause the apparatus to:
verify the need to activate the alarm by verifying authenticity of the need to activate the alarm without requiring additional data indicative of sensed conditions to be received after determining the need to activate the alarm.

67. The apparatus of claim 56, wherein the executable instructions, when executed by the processor, further cause the apparatus to:
receive third data indicative of an additional alarm condition sensed at the location;
determine whether to vary a parameter of the activated alarm at the location based on the third data, wherein the parameter comprises one or more of a scope, a duration, and an intensity; and
in response to determining to vary the parameter of the activated alarm at the location, transmit an instruction to vary the parameter of the activated alarm.

68. The apparatus of claim 56, wherein the executable instructions, when executed by the processor, further cause the apparatus to:
transmit an instruction to prevent a gateway from activating the alarm unless the gateway receives the instruction to activate the alarm.

69. An apparatus comprising:
a processor; and
memory storing executable instructions that, when executed by the processor, cause the apparatus to:
receive first data indicative of an alarm condition at a first location, wherein the apparatus is at a second location;
determine that the first data indicates a need to activate an alarm at the first location; and
after receiving the first data and responsive to determining that the apparatus has lost communication with the first location, verify the need to activate the alarm based on second data previously received by the apparatus from the first location.

70. The apparatus of claim 69, wherein the executable instructions, when executed by the processor, further cause the apparatus to:
determine that the apparatus has lost communication with the first location;
prior to determining that the apparatus has lost communication with the first location, receive the second data from a device at the first location and store the second data at the second location; and
verify the need to activate the alarm based on the second data stored at the second location.

71. The apparatus of claim 69, wherein the executable instructions, when executed by the processor, further cause the apparatus to:
determine that the apparatus has lost communication with the first location;
prior to determining that the apparatus has lost communication with the first location, receive the second data from a device at the first location and store the second data at a third location different from the second location and the first location; and
verify the need to activate the alarm based on the second data stored at the third location.

72. The apparatus of claim 69, wherein the first data and the second data are generated by a sensor at the first location.

73. The apparatus of claim 69, wherein the first data is generated by a first sensor at the first location, and wherein the second data is generated by a second sensor at the first location.

74. The apparatus of claim 73, wherein the first sensor and the second sensor comprise two of the following: an audio sensor, a video camera, a temperature sensor, an air quality sensor, and a presence sensor.

75. The apparatus of claim 69, wherein the executable instructions, when executed by the processor, further cause the apparatus to:
in response to verifying the need to activate the alarm, transmit an instruction to the first location to activate the alarm.

76. The apparatus of claim 69, wherein the executable instructions, when executed by the processor, further cause the apparatus to:
in response to verifying the need to activate the alarm, perform at least one of the following:
transmit an instruction to a third location to activate the alarm at the first location, and
transmit a message to the third location notifying a user at the third location of the alarm condition at the first location.

77. The apparatus of claim 69, wherein the executable instructions, when executed by the processor, further cause the apparatus to:
determine that the first data indicates the need to activate an alarm based on monitoring criteria associated with one of one or more of elder monitoring, video monitoring, audio monitoring, medical monitoring, and energy management.

78. The apparatus of claim 69, wherein the first data indicative of the alarm condition comprises data from a presence sensor at the first location, and wherein the executable instructions, when executed by the processor, further cause the apparatus to verify the need to activate the alarm based on the second data previously received by the apparatus by:
retrieving a video received from a video recording device at the first location; and
verifying the need to activate the alarm using the video received from the video recording device at the first location.

79. An apparatus comprising:
a processor; and
memory storing executable instructions that, when executed by the processor, cause the apparatus to:
send first data that indicates an alarm condition sensed by a first sensor at a location and second data sensed by a second sensor at the location and associated with the alarm condition;
receive an instruction to activate an alarm at the location, wherein the instruction is based on a determination that the second data sensed by the second sensor verifies the first data that indicates the alarm condition; and
in response to receiving the instruction, activate the alarm at the location.

80. The apparatus of claim 79, wherein the executable instructions, when executed by the processor, further cause the apparatus to:
in response to sending third data, receive an instruction to vary a parameter of the alarm, wherein the parameter comprises one or more of a scope, a duration, and an intensity.

81. The apparatus of claim 80, wherein the first data and the second data correspond to the alarm condition at a first time, and the third data corresponds to the alarm condition at a second time later than the first time.

82. The apparatus of claim 79, wherein the first sensor and the second sensor comprise two of the following: an audio sensor, a video camera, a temperature sensor, an air quality sensor, and a presence sensor.

83. The apparatus of claim 79, wherein the location comprises a first location, and wherein the executable instructions, when executed by the processor, further cause the apparatus to:
send the first data and the second data to a second location; and
receive the instruction to activate the alarm from a third location different from the first location and the second location.

* * * * *